(No Model.) 3 Sheets—Sheet 1.
W. H. JOHNSON.
MECHANISM FOR OVERCOMING DEAD CENTERS.
No. 554,223. Patented Feb. 4, 1896.
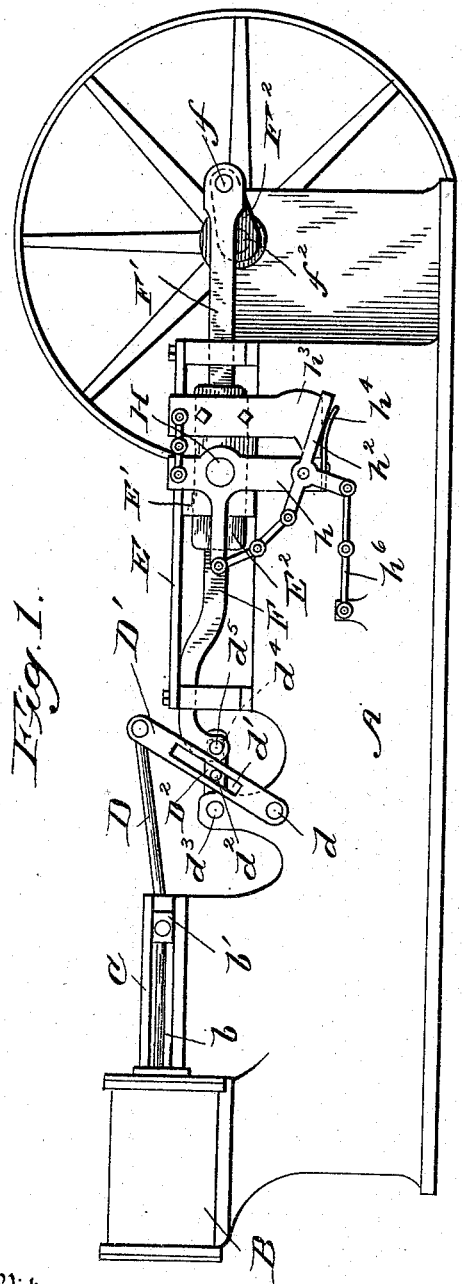

(No Model.) 3 Sheets—Sheet 2.
W. H. JOHNSON.
MECHANISM FOR OVERCOMING DEAD CENTERS.
No. 554,223. Patented Feb. 4, 1896.
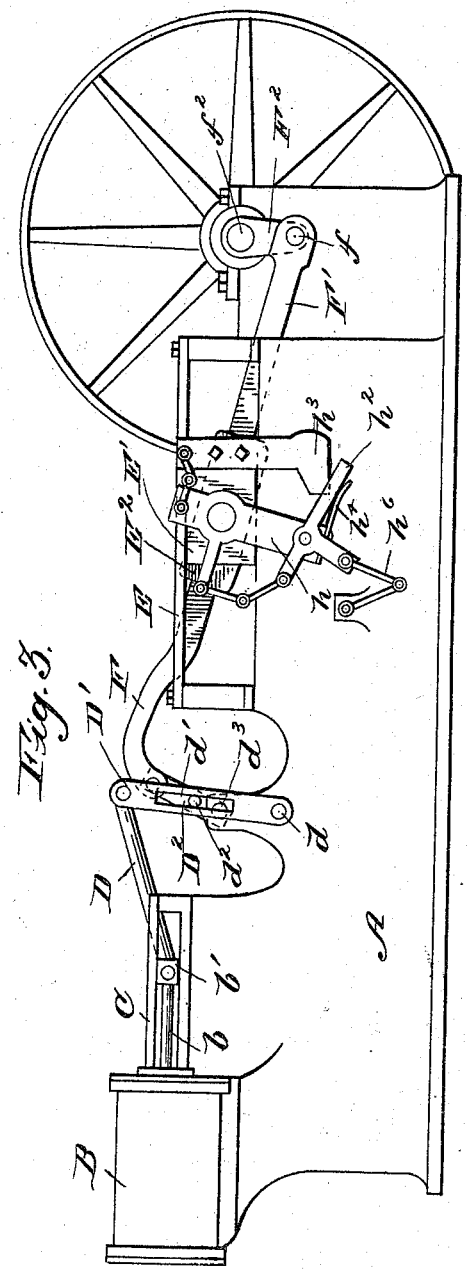
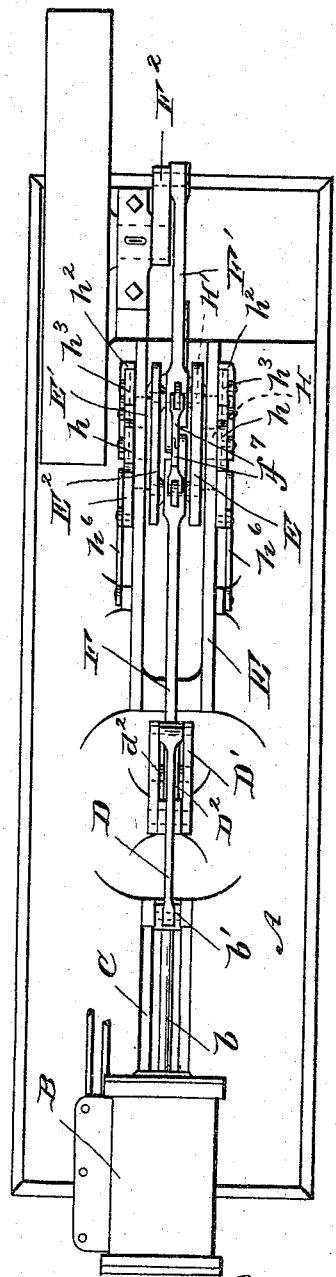
Witnesses
C. M. Sweeney
Arthur F. Randall
Inventor
William H. Johnson
by H. A. Engelman
Attorney (No Model.) 3 Sheets—Sheet 3.
W. H. JOHNSON.
MECHANISM FOR OVERCOMING DEAD CENTERS.
No. 554,223. Patented Feb. 4, 1896.
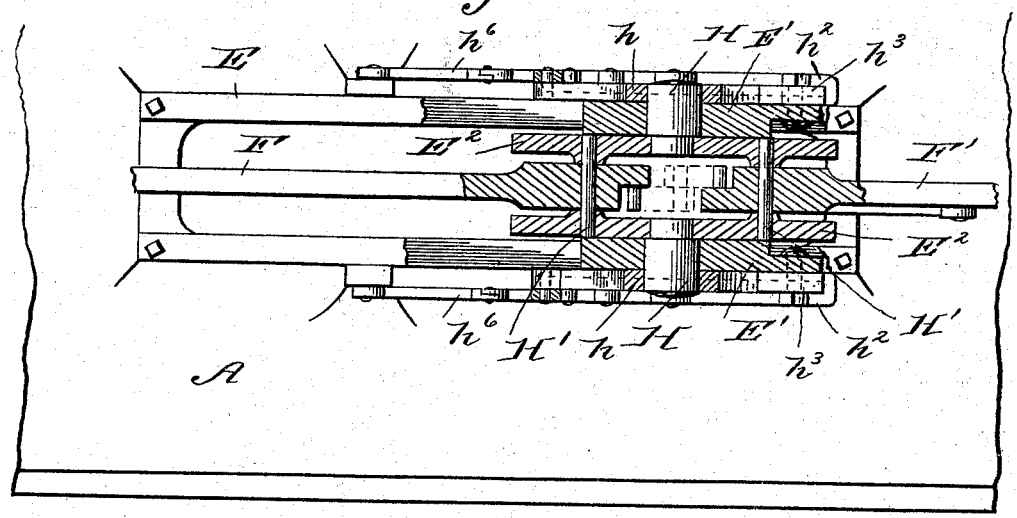
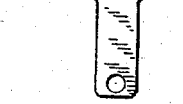
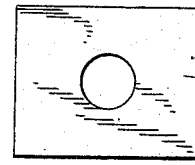
Witnesses
C. M. Sweeney
Arthur F. Rudall
Inventor
Willie H. Johnson
by [Attorney signature]
Attorney

UNITED STATES PATENT OFFICE.

WILLIE HARRY JOHNSON, OF NAVASOTA, TEXAS.

MECHANISM FOR OVERCOMING DEAD-CENTERS.

SPECIFICATION forming part of Letters Patent No. 554,223, dated February 4, 1896.

Application filed July 10, 1895. Serial No. 555,549. (No model.)

*To all whom it may concern:*

Be it known that I, WILLIE HARRY JOHNSON, a citizen of the United States, residing at Navasota, in the county of Grimes and State of Texas, have invented certain new and useful Improvements in Mechanism for Overcoming Dead-Centers; and I do hereby declare the following to be a full, clear, and exact description of the invention, such as will enable others skilled in the art to which it appertains to make and use the same.

My invention has for its object to provide mechanism for overcoming what are known in mechanics as "dead-centers," which occur in machines where a shaft is driven by means of a crank.

I have shown my invention as applied to a steam-engine of the type which has a horizontally-moving piston and crank-arm.

The essential feature of my invention consists in a two-part or compound crank-rod of such construction as that the members are automatically locked or secured together at the proper point in the stroke, so as to act as a single rod, and at other intervals of its travel are automatically unlocked, so as that each member will act independently of the other.

Other features of novelty will be hereinafter enumerated, and particularly pointed out in the claims.

In the drawings, Figure 1 is a side elevation of an engine, showing my invention applied thereto, the parts being in the position they assume just as the crank approaches one dead-center point. Fig. 2 is a similar view showing the parts in the position they assume as the crank reaches the other dead-center point. Fig. 3 is a similar view showing the parts as they appear at the point in the stroke when the crank-pin is in its lowermost position. Fig. 4 is a plan view. Fig. 5 is an enlarged sectional view on line 1 1 of Fig. 1. Figs. 6, 7, 8, 9, and 10 are detail views of some of the parts.

Referring to the drawings by letter, A denotes the base of the engine; B, the steam-cylinder; $b$, the piston-rod, and $b'$ a sliding block at the forward end of the piston-rod $b$, said block being mounted in a suitable guiding-frame C, in which it is free to slide. Pivoted to said block $b'$ is a rod D, which is pivotally connected at its other end to a swinging arm D' pivoted at $d$ to the base A of the engine. A slot $d'$ is formed in this arm D', and in said slot $d'$ is fitted a pin $d^2$ carried by a second arm $D^2$ pivoted to the machine-frame at $d^3$. The outer end of said arm $D^2$ has a slot $d^4$ formed therein, and in said slot works a pin $d^5$ carried by the crank-rod of the engine. I will now describe in detail the construction of the crank-rod, the way it is mounted, and its operation.

Mounted in a suitable guideway E, secured to the base A of the engine, are two sliding blocks E', to which are secured two plates $E^2$ mounted on pivots H so as that they are free to swing on their pivots in said blocks E' and yet slide with the latter as it moves in its guideway E. Pivoted in said plates $E^2$ are the two cross-shaped members F F', which form the compound crank-rod. The member F carries at the end of its long arm the pin $d^5$, (referred to above,) which is engaged by the slotted arm $D^2$. The long arm of the member F engages the crank-pin $f$ of the crank-arm F', which is secured to the driven shaft $f^2$. The inner ends of said cross-shaped members F F' are connected by means of the links $f^3$, which are pivoted to said members and at their other ends are pivoted together, so as to form a toggle connection between the members F and F'.

Pivoted at $f^5$ on the member F' is a strap G which engages a foot $f^6$ on the transverse arm of the cross-shaped member F and locks the two members F F' together. When in this position the two members form a rigid connection between the crank of the driven shaft and the swinging arm $D^2$ and turn on their pivotal point H in the sliding block E' as one rod, the upper ends of the transverse bar of the cross-shaped members F F' being connected by means of the links $f^7$. When the parts are in the position shown in Fig. 1 it will be seen that as the piston is driven to its other position the swinging arm D will be moved and will, by the pin-and-slot connection with the arm $D^2$, raise the latter and consequently lift the end of the member F of the crank-rod. Since members F F' are locked together, as above described, they will be turned on their main pivots H, and the end of arm F' which is connected with the crank of the driven shaft will be forced directly downward and carried past the dead-center line. The action of the piston continuing, the sliding block E' will be moved along its guideway E until the crank-pin $f$ will have reached a point diametrically opposite. At this point the strap G will be thrown out of its locking position by means of the double link $g$, which is secured to the frame A and also to an arm $g'$ of the strap G, so as that when the crank-arm reaches its extreme movement in one direction the strap G will be pulled off and the two members F F' unlocked.

In order that the strap G may be automatically locked when the crank-arm is returned to the point where it is desirable that the two members F F' should again be locked together, I provide a spring G' which bears against the under side of strap G, so that when the members F F' return to position for locking them together the spring G' will throw the strap G up into engagement with the foot $g^6$ of the member F.

The action of the crank-rod in carrying the crank past one dead-center having been described, I will now point out the way in which the dead-center point diametrically opposite the one just referred to is overcome.

When the parts are in the position shown in Fig. 2, the members F F' will have been unlocked from each other by the mechanism just described and will be free to turn on their individual pivots H' in the plates E². It is necessary, however, that the plates E² in which the members F F' are mounted and between which they swing, when locked together be locked so as to prevent them from swinging on their pivots H. The pivots H pass through the sides of the sliding blocks E', and fixed on the ends of pivots H are two T-shaped arms $h\ h'$. These arms turn with the main pivots H and carry straps $h^2$ similar to the straps G referred to above. These straps $h^2$ engage the lower ends of arms $h^3$ rigidly secured to the sliding blocks E' but free to move therewith. The action of the straps $h^2$ is controlled by springs $h^4$ carried by the T-shaped arms $h\ h'$ in the same manner as that described in connection with the locking of the arms together by the strap G. When the piston has reached its limit of movement in one direction, the two members F F' being unlocked, the straps $h^2$ will engage the arms $h^3$ and lock the plates E² against movement on the central pivots H. The piston then makes its return stroke and the action of the swinging arms D' and D² will be the same as described above, except, of course, their direction of movement will be reversed. The long arm of the member F of the crank-rod will be lifted, but the said member F will now turn on its individual pivot H' since it is unlocked from the member F'. As the member F swings on its individual pivot H' its inner end or short arm will be swung downward and the member F', through the toggle-link connection $f^3$ with member F, will be tilted in the opposite direction and its outer end or long arm will be given an upward thrust to carry the crank past the dead-center point. The action of the piston continuing, the crank-arm will be carried to the position just described, and just before it reaches the dead-center point first referred to the straps $h^2$ will be pulled off the arms $h^3$ by means of the links $h^6\ h^6$, thereby leaving the plates E² free to turn on their central pivots H, and at the moment the dead-center point is reached the strap G will again automatically lock the members F F' together, as before described, in readiness for the thrust past the first-mentioned dead-center point.

From the foregoing it will be apparent that I have devised means for overcoming the dead-center points in crank-driven shafts, and while I have shown my invention applied to a steam-engine I do not limit myself to its use in that particular class of machinery, as it can be applied wherever there are dead-centers to be overcome.

Having thus described my invention, I claim and desire to secure by Letters Patent—

1. The combination, with a suitable motor, of a crank-shaft to be driven thereby, a crank-rod connecting said crank-shaft and motor, said crank-rod being composed of two members which are locked together during a portion of the stroke and move independently of one another during the remainder of the stroke, and means for locking said members together.

2. The combination with a suitable motor, of a crank-shaft to be driven thereby, a crank-rod composed of two members connecting said motor and crank-shaft means for locking said members together at a predetermined point in the stroke.

3. The combination, with a suitable motor, of a crank-rod composed of two members connecting said motor and crank-shaft, means for locking said members together during a portion of the stroke and means for unlocking them so as that said members shall act independently during the remainder of the stroke.

4. The combination with a suitable motor, of a crank-shaft, a crank-rod connecting said motor and crank-shaft, means for automatically locking together and unlocking the members of the crank-rod during predetermined portions of the stroke.

5. In a motor, the combination with a reciprocating piston, of a crank-shaft, a crank-rod composed of two members connecting said piston and crank-shaft, plates in which said crank-rod members are mounted, sliding blocks in which said plates are pivoted and means for locking said crank-rod members together during a portion of the stroke.

6. In a motor, the combination with a reciprocating piston, of a crank-shaft, a crank-rod composed of two members connecting said piston and crank-shaft, plates in which said crank-rod members are mounted, sliding blocks in which said plates are pivoted and means for automatically locking said crank-rod members together during a portion of the stroke.

7. In a motor, the combination with a reciprocating piston, of a crank-shaft, a crank-rod, composed of two members, connecting said piston and crank-shaft suitable guideways on the motor-frame, sliding blocks mounted in said guideways, plates pivoted in said sliding blocks and reciprocating therewith, said crank-rod members being mounted in said plates so as to partake of both the reciprocating and pivotal movements of said plates during a portion of the stroke.

8. In a motor, the combination with a reciprocating piston, of a crank-shaft, a two-part crank-rod connecting said piston and crank-shaft suitable guideways on the motor-frame, sliding blocks mounted in said guideways, plates, in which said crank-rod members are pivoted, mounted on pivots in said blocks and reciprocating therewith, means for locking said sliding blocks and pivoted plates together during a portion of the stroke, and means for locking said crank-rod members and plates together during the remainder of the stroke.

9. In a motor, the combination with a reciprocating piston, of a crank-shaft, a two-part crank-rod connecting said piston and crank-shaft suitable guideways on the motor-frame, sliding blocks mounted in said guideways, plates, in which said crank-rod members are pivoted, mounted on pivots in said blocks and reciprocating therewith, means for automatically locking said sliding blocks and pivoted plates together during a portion of the stroke, and means for automatically locking said crank-rod members and plates together during the remainder of the stroke.

10. In a motor, the combination with a reciprocating piston, of a crank-shaft, a two-part crank-rod connecting said piston and crank-shaft suitable guideways on the motor-frame, sliding blocks mounted in said guideways on the motor-frame, plates, in which the members of said two-part crank-rod are pivoted, pivotally mounted in said blocks, spring-pressed straps which lock said blocks and plates together during a portion of the stroke, means for disengaging said straps, spring-pressed straps for securing said crank-rod members and plates together, and means for disengaging said straps.

11. In a motor, the combination with a reciprocating piston, of a crank-shaft, a two-part crank-rod connecting said piston and crank-shaft, suitable guideways on the motor-frame sliding blocks mounted in said guideways on the motor-frame, plates, in which the members of said two-part crank-rod are pivoted, pivotally mounted in said blocks, spring-pressed straps which lock said blocks and plates together during a portion of the stroke, means for automatically disengaging said straps, spring-pressed straps for securing said crank-rod members and plates together, and means for automatically disengaging said straps.

12. In a motor, the combination, with a reciprocating piston, of a crank-shaft, a two-part crank-rod connecting said piston and crank-shaft, and connections between said reciprocating piston and crank-rod whereby the latter is operated so as to give a thrust at right angles to its line of reciprocation, at predetermined intervals.

13. In a motor, the combination with a reciprocating piston, of a crank-shaft, a two-part crank-rod connecting said piston and crank-shaft suitable guideways on the motor-frame, sliding blocks mounted in said guideways on the motor-frame, plates, pivoted in said blocks and reciprocating therewith, means for locking said plates against pivotal movement, the two members of the two-part crank-rod pivotally mounted in said plates, means for locking said members against pivotal movement on their individual pivots, and connections between said reciprocating piston and crank-rod by means of which the opposite end of the said crank-rod is given a thrust at right angles to its line of reciprocation during predetermined intervals in its stroke.

14. In a motor, the combination with a reciprocating piston, of a crank-shaft, a two-part crank-rod connecting said piston and crank-shaft suitable guideways on the motor-frame, sliding blocks mounted in said guideways on the motor-frame, plates pivoted in said blocks and reciprocating therewith, means for automatically locking said plates against pivotal movement, the two members of the two-part crank-rod pivotally mounted in said plates, means for automatically locking said members against pivotal movement on their individual pivots, and connections between said reciprocating piston and crank-rod by means of which the opposite end of the said crank-rod is given a thrust at right angles to its line of reciprocation during predetermined intervals in its stroke.

In testimony whereof I affix my signature in presence of two witnesses.

WILLIE HARRY JOHNSON.

Witnesses:
G. C. AUKAM,
A. V. CUSHMAN.